(12) United States Patent
Mah et al.

(10) Patent No.: US 6,982,708 B1
(45) Date of Patent: Jan. 3, 2006

(54) VISUALLY DISPLAYING SEQUENTIALLY ORDERED DATA FOR MINING

(75) Inventors: Teresa Mah, Redmond, WA (US); Ying Li, Bellevue, WA (US); Brian Burdick, Bellevue, WA (US); Kevin Paul Kornelson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 10/301,220

(22) Filed: Nov. 21, 2002

Related U.S. Application Data

(63) Continuation-in-part of application No. 10/056,766, filed on Jan. 25, 2002.

(51) Int. Cl.
G06F 17/00 (2006.01)

(52) U.S. Cl. ..................................... 345/418
(58) Field of Classification Search ................. 345/418
See application file for complete search history.

(56) References Cited

U.S. PATENT DOCUMENTS

| | | | |
|---|---|---|---|
| 5,644,740 A | 7/1997 | Kiuchi | |
| 5,978,787 A | 11/1999 | Wong et al. | |
| 6,035,330 A * | 3/2000 | Astiz et al. | 709/218 |
| 6,115,693 A | 9/2000 | McDonough et al. | |
| 6,199,034 B1 | 3/2001 | Wical | |
| 6,233,592 B1 | 5/2001 | Schnelle et al. | |
| 6,236,991 B1 | 5/2001 | Frauenhofer et al. | |
| 6,247,020 B1 | 6/2001 | Minard | |
| 6,314,424 B1 | 11/2001 | Kaczmarski et al. | |
| 6,330,596 B1 | 12/2001 | Stuckman et al. | |
| 6,341,286 B1 | 1/2002 | Kawano | |
| 6,359,635 B1 | 3/2002 | Perttunen | |
| 6,370,145 B1 | 4/2002 | Dally et al. | |
| 6,421,724 B1 | 7/2002 | Nickerson et al. | |
| 6,499,036 B1 | 12/2002 | Gurevich | |
| 6,571,333 B1 | 5/2003 | Jain et al. | |
| 6,654,381 B2 | 11/2003 | Dally et al. | |
| 6,675,202 B1 | 1/2004 | Perttunen | |
| 6,704,745 B2 | 3/2004 | Bella-Libera et al. | |
| 2002/0007373 A1 | 1/2002 | Blair et al. | |
| 2002/0083067 A1 | 6/2002 | Tamayo et al. | |
| 2002/0107699 A1 | 8/2002 | Rivera et al. | |
| 2002/0112048 A1 | 8/2002 | Gruyer et al. | |
| 2002/0136389 A1 | 9/2002 | Fleischer, III et al. | |
| 2002/0143558 A1 | 10/2002 | Joseph | |
| 2002/0147805 A1 * | 10/2002 | Leshem et al. | 709/223 |
| 2002/0169980 A1 | 11/2002 | Brownell | |
| 2003/0033155 A1 | 2/2003 | Peerson et al. | |
| 2003/0084011 A1 | 5/2003 | Shetty | |
| 2003/0115191 A1 | 6/2003 | Copperman et al. | |
| 2003/0154237 A1 * | 8/2003 | Mah et al. | 709/201 |

OTHER PUBLICATIONS

"A Study of Three Browser History Mechanisms for Web Navigation", Nadeem & Killam, 0-7695-1195-3/01, 2001, IEEE.*

(Continued)

*Primary Examiner*—Almis R. Jankus
*Assistant Examiner*—Jon Hadidi
(74) *Attorney, Agent, or Firm*—Senniger Powers

(57) ABSTRACT

Displaying a funnel from clickstream data as a hierarchy to a user for analysis wherein the funnel represents an ordered path of web pages successively viewed by the user. The invention includes clickpath visualization software to enable the user to easily analyze and evaluate clickpaths by focusing only on subpaths of interest. The invention software provides the user with various functions including, but not limited to, zoom, sort, expand, reverse, preview, and activate.

41 Claims, 9 Drawing Sheets

OTHER PUBLICATIONS

"Web TOC: A Tool to Visualize and Quantify Web Sites using a Hierarchal Table of Contents Browser", Nation, ISBN: 1-58113-028-7, ACM.*

"Pad++: A Zooming Graphical Interface for Exploring Alternate Interface Physics", Bederson & Hollan, 0-89791-657-3/94/0011,1994, ACM.*

"Graphical Multiscale Web Histories: A Study of PadPrints", Hightower et. al., 1998, www.cs.unm.edu/pad++.*

Mah et al. "Funnel Report Mining for the MSN Network," Proceedings of the Seventh ACM SIGKDD International Conference on Knowledge Discovery and Data Mining, 2001, pp. 450-455, ACM Press, USA.

Srikant et al., "Mining Sequential Patterns: Generalizations and Performance Improvements," Proceedings of the Fifth International Conference on Extending Database Technology, Mar. 1996, 15 pages, USA.

Cadez et al., "Visualization of Navigation Patterns on a Web Site Using Model-Based Clustering," Proceedings of the Sixth ACM SIGKDD International Conference on Knowledge Discovery and Data Mining, 2000, pp. 280-284, ACM Press, USA.

Kato et al., "Navigation Analysis Tool Based on the Correlation Between Contents Distribution and Access Patterns," Proceedings of the Web Mining for E-Commerce Workshop (WEBKDD), Aug. 2000, 10 pages, USA.

Berendt, "Web Usage Mining, Site Semantics, and the Support of Navigation," Proceedings of the Web Mining for E-Commerce Workshop (WEBKDD), Aug. 2000, 11 pages, USA.

Gaul et al., "Mining Web Navigation Path Fragments," Proceedings of the Web Mining for E-Commerce Workshop (WEBKDD), Aug. 2000, 6 pages, USA.

Wu et al., "SpeedTracer: A Web Usage Mining And Analysis Tool," IBM Systems Journal 37(1), 1998, 13 pages, USA.

Srivastava et al., "Web Usage Mining: Discovery and Applications of Usage Patterns from Web Data," SIGKDD Explorations, vol. 1, Issue 2, 2000, pp. 12-23, USA.

Chi et al., "Using Information Scent to Model User Information Needs and Actions and the Web," Proceedings of the SIGCHI Conference on Human Factors in Computing Systems, 2001, pp. 490-497, ACM Press, USA.

Borges, "A Data Mining Model to Capture User Web Navigation Patterns," PhD Thesis, Department of Computer Science, University College London, Jul. 2000, 205 pages, England.

Berendt, "Understanding Web Usage at Different Levels of Abstraction: Coarsening and Visualising Sequences," Humboldt University Berlin, Institute of Pedagogy and Informatics, 12 pages, Berlin, Germany.

Berkhin et al., "Interactive Path Analysis of Web Site Traffic," Proceedings of the Seventh ACM SIGKDD International Conference on Knowledge Discovery and Data Mining, 2001, pp. 414-419, ACM Press, New York, U.S.A.

Eick, "Visualizing Online Activity," Communications of the ACM, Aug. 2001, pp. 45-50, vol. 44, Issue 8, ACM Press, New York, U.S.A.

Mceneaney, "Visualizing and Assessing Navigation in Hypertext," Proceedings of the Tenth ACM Conference on Hypertext and Hypermedia, 1999, pp. 61-70, ACM Press, New York, U.S.A.

Keim, "Visual Exploration of Large Data Sets," Communications of the ACM, Aug. 2001, pp. 38-44, vol. 44, Issue 8, ACM Press, New York, U.S.A.

Derthick et al., "An Interactive Visual Query Environment for Exploring Data," Proceedings of the 10th Annual ACM Symposium on User Interface Software and Technology, pp. 189-198, 1997, ACM Press, New York, U.S.A.

Joshi et al., "Warehousing and Mining Web Logs," Proceedings of the Second International Workshop on Web Information and Data Management, 1999, pp. 63-68, ACM Press, New York, U.S.A.

Lerner, "At the Forge: Introducing SOAP," Mar. 2001, ACM, 6 pages.

* cited by examiner

VISUALLY DISPLAYING SEQUENTIALLY ORDERED DATA FOR MINING

CROSS-REFERENCE TO RELATED APPLICATION

This is a continuation-in-part of U.S. patent application Ser. No. 10/056,766, filed Jan. 25, 2002.

TECHNICAL FIELD

The present invention relates to the field of data mining. In particular, this invention relates to visually displaying sequentially ordered data for mining.

BACKGROUND OF THE INVENTION

As complex structures are extracted from input data sets, the practice of data mining is challenged with keeping analysts closer to the data exploration process to reveal powerful insight upon which business owners can directly act. For example, existing clickpath mining methods have focused on reporting top clickpaths, sequential patterns, and funnel analyses from input clickstreams. As powerful as such clickpath mining methods may be, they often lead to huge, incomprehensible, and non-interesting result sets. Most existing business intelligence products have not attempted to address the problem of clickpath visualization. Of the existing business intelligence products that address the problem of clickpath visualization, most of the products present massive cross-weaving web graphs or multi-directed graphs. Unfortunately, this type of structure becomes too complex to analyze and mine as the number of clickpaths increases. These challenges stress the importance of an interactive and visual representation of clickpath mining results. In addition, these challenges underscore the importance of a visual representation of funnels to more easily absorb mined results and provide visual impact for business action. For example, understanding how users navigate web sites helps site designers improve site design to provide a better user experience. Existing clickpath mining methods do not easily lend themselves to providing powerful insight into how users traverse sites. This makes it difficult for site designers to both understand and take action on the results.

For these reasons, a system for visually mining sequentially ordered data is desired to address one or more of these and other disadvantages.

SUMMARY OF THE INVENTION

The invention includes software to display a funnel from sequentially ordered data (e.g., clickstream data) as a hierarchy to a user for analysis. In the clickstream embodiment, the funnel represents an ordered path of web pages successively viewed by the user. In particular, the invention includes a clickpath visualization software product that enables users to easily analyze and evaluate clickpaths by focusing only on subpaths of interest. For example, the primary structure of clickpath visualization is a tree. Visualization techniques of the invention enhance the detection of interesting clickpath patterns from data. The clickpath visualization product of the invention simplifies a visualization space while still retaining a high degree of mineable knowledge in the data. The invention software focuses the visualization of clickpaths or funnels on a number of select starting points in a relatively linear manner. This emphasis on focus narrows the scope and zooms in on only a number of points of interest. Because no one technique can be used to detect all types of patterns, the invention includes a package of visual techniques that can be used to enhance the mining of clickpaths. The invention software is part of an interactive application enabling business owners to view, explore, mine and drill down on the clickpaths of interest.

The invention provides numerous advantages. For example, the invention visually identifies clickpaths above a certain interest threshold, graphically analyzes these clickpaths in more detail, visually focuses on all clickpaths entering a certain point, and visually focuses on all clickpaths exiting a certain point.

In accordance with one aspect of the invention, a method displays a funnel from clickstream data to a user for analysis in a computer system having a graphical user interface including a display and a user interface selection device. The funnel represents an ordered path of web pages successively viewed by the user. The method includes displaying the funnel as a hierarchy on the display. The hierarchy has one or more nodes each corresponding to at least one of the web pages. The method also includes receiving from the user a selection corresponding to one or more of the nodes via the user interface selection device. The method also includes receiving an execution signal from the user via the user interface selection device to perform an operation associated with the selected nodes. The method also includes altering the displayed hierarchy on the display in response to the received execution signal to indicate a result of the performed operation.

In accordance with another aspect of the invention, a method displays a funnel from clickstream data to a user for analysis. The funnel represents an ordered path of web pages successively viewed by the user. The method includes displaying the funnel as a hierarchy. The hierarchy has one or more nodes each corresponding to at least one of the web pages. The method also includes receiving from the user a selection corresponding to one or more of the nodes. The method also includes receiving an execution signal from the user to perform an operation associated with the selected nodes. The method also includes altering the displayed hierarchy in response to the received execution signal to indicate a result of the performed operation.

In accordance with still another aspect of the invention, one or more computer-readable media have computer-executable components for displaying a funnel from clickstream data to a user for analysis. The funnel represents an ordered path of web pages successively viewed by the user. The components include a user interface component for displaying the funnel as a hierarchy. The hierarchy has one or more nodes each corresponding to at least one of the web pages. The components also include a communication component for receiving from the user a selection corresponding to one or more of the nodes and an execution signal to perform an operation associated with the selected nodes. The user interface component alters the displayed hierarchy in response to the execution signal received via the communication component to indicate a result of the performed operation.

In accordance with yet another aspect of the invention, a computer-readable medium stores a data structure for a particular node in a hierarchy. The data structure stores at least one clickpath from one or more input clickstreams representing an ordered path of successively viewed web pages of a user. The hierarchy has a root node. Each particular node is associated with one of the viewed web pages. The data structure includes an identifier field storing a resource address for the viewed web page associated with the particular node. The data structure also includes a data field storing data pertaining to a funnel analysis involving the particular node.

In accordance with still another aspect of the invention, a user interface is rendered on a display device. The user interface displays a funnel from clickstream data as a hierarchy to a user for analysis. The funnel represents an ordered path of web pages successively viewed by the user. The user interface includes a node in the hierarchy. The user interface also includes a user command for performing an operation associated with data pertaining to a funnel analysis involving the node. The user interface also includes a visual indicator associated with the node. The visual indicator corresponds to a result after executing the user command.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
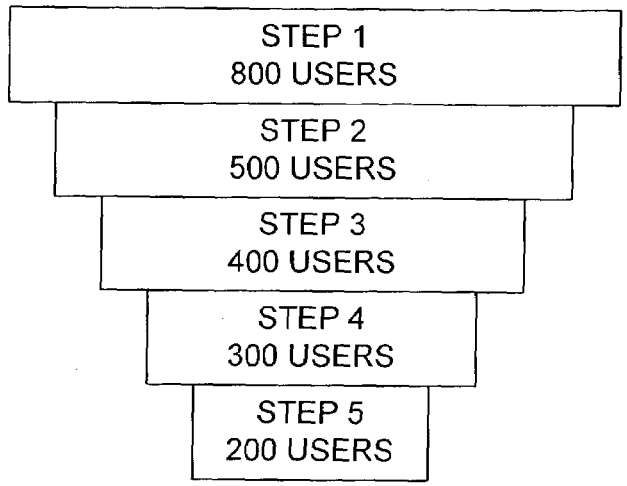
FIG. 1 is an exemplary block diagram of a sample funnel.

According to one embodiment, the invention displays a funnel to a user for analysis (e.g., a funnel mining analysis). In particular, the invention displays the funnel, which is generated from sequentially ordered data such as clickstream data, as a hierarchy (e.g., see FIG. 3). The invention focuses the visualization of funnels on a number of select starting points in a relatively linear manner. This emphasis on focus narrows the scope and zooms in on only a number of points of interest. Because no one technique can be used to detect all types of patterns, the invention includes a package of visual techniques that can be used to enhance the mining of sequentially ordered data.

For example, the invention provides a user interface permitting users to visualize sequentially ordered data such as a clickpath. Those skilled in the art recognize that a clickpath is a connection between a number of different points (i.e. URLs, websites) in a network. The fundamental nature of the problem of clickpath visualization is inherent in the nature or structure of the web itself. Discerning between clickpaths entering and exiting a point becomes problematic when dealing with an entity as large as the web. Another issue with clickpath visualization is how to present clickpaths of interest and facilitate visual detection of previously unknown patterns, thus making mining of valuable information from the clickpaths an almost effortless task.

Funnel Reports

Further, the invention supports visualizing sequentially ordered data such as a funnel report. In general, a funnel report is a study of the clickpath and retention behavior among a series of pages or sites. For example, a funnel report includes data indicating the percentage of hits on a home page that are followed by hits to another web page. In other examples, a funnel report may identify the most interesting funnels starting with a particular web page or identify the greatest drop off rate occurring after a user has visited a particular web page. In another example, funnel reports provide a measure of how well an on-line sign-up process works. Suppose a site has three specific steps (pages) in its sign-up process. An analyst may wish to know the number of users who hit the first page of the sign-up process, how many then proceeded to the second step and, finally, the number that ended up at the last page and successfully subscribed to the service. The end result of this analysis is a picture of a funnel where the width at the top of the funnel represents all of the users who had been to the first step of the sign-up process. The width in the middle of the funnel represents the number of users who had seen both the first and second pages of the sign-up process, and the bottom of the funnel reveals the number of users who ended up at the last page and finally subscribed to the service. The width is referred to as the retention rate or the drop-off rate depending on the analyst's perspective. Wide funnels are those areas of the site/clickpaths with the greatest retention rates; narrow funnels are those areas of the site/clickpaths with greatest drop-off rates. A significant drop-off rate between one step and the next may indicate that the site should restructure its sign-up process to increase retention. Different Internet properties and services can produce extremely different funnel shapes. Empirical data shows that drop-off rates between funnel steps can be as high as 98% or as low as 2%.

FIG. 1 shows a sample funnel with five steps in a subscription process. In this example, 800 users hit step 1. Of those 800, 500 of them hit step 2 after viewing step 1. FIG. 1 further shows that 400 users performed the first three steps, 300 performed the first four steps, and only 200 finished all five steps. In effect, 25% of users who hit step 1 reached the last step of the funnel.

Figure 3:
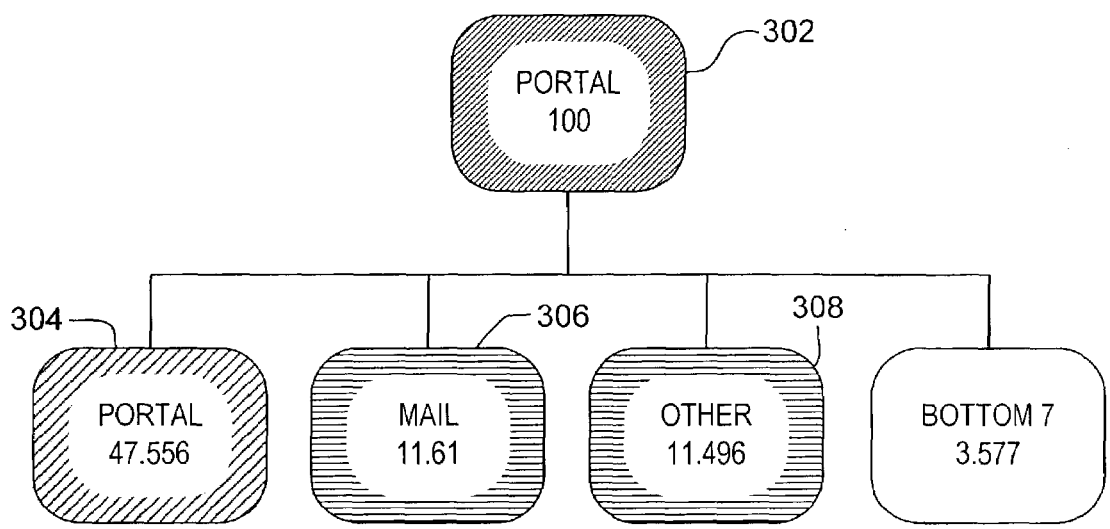
FIG. 3 is an exemplary block diagram illustrating a two-level subpath tree.

Generally, the invention stores an input clickstream having an ordered path of successively viewed web pages in one or more tree structures (e.g., see FIG. 3). The tree structures, which are hierarchies, have a root node corresponding to one of the pages in the input clickstream, and successive child nodes corresponding to the successively accessed web pages in the input clickstream. During tree generation, each path in a tree represents all of the clickpaths found (up to a maximum depth) that begin with the page at the root of the tree. In one embodiment, the invention creates a tree for each starting page. A counter at each node in the trees stores the number of sessionized clickstreams that include the subpath that ends at each node. The invention is operable with any funnel analysis algorithm producing sequentially ordered data.

The present invention provides measures of interestingness to determine whether a funnel is "interesting." This can be achieved through depth and width criteria. The depth of a funnel is the number of levels (funnel steps) in the funnel. Interesting funnels can be specified as having exactly X levels or less than or equal to X levels. For example, a funnel with the points A, B, C, D, and E has a depth of five. With this invention, the definition of interestingness is the drop-off rates of the funnel.

Width criteria refer to each step in the funnel. The width of a point can be measured in terms of both absolute and relative frequency. The width of a funnel point, measured relatively, is the frequency of the full path ending at that point in the funnel divided by the frequency of the first (top) page of the funnel. The invention can specify a width criterion at each level of the funnels of interest. Another way to specify width is to look at only the last level's width. Requiring that the last level width of interesting funnels be of a certain size (e.g., less than or equal to 10%) would imply narrower funnels. A last level width criterion of greater than or equal to 60%, for example, may indicate interest in wider funnels. For simplicity, width generally refers to last level relative width.

Similar to width criteria, depth criteria can be specified in terms of maximum, minimum, absolute, or relative criteria. However, in one embodiment, only maximum depth criteria and absolute depth criteria are used to optimize tree generation (i.e., to reduce analysis time and limit the amount of memory used to store the trees by reducing the number of trees and nodes). Minimum depth criteria are analyzed along with width criteria after the trees have been generated.

Using criteria such as these, a funnel analysis algorithm involves, for a set of users' clickstreams, reporting all funnels with minimum or maximum width X at each level and maximum depth Y. In one embodiment, the invention software includes such a funnel analysis algorithm. In another embodiment, the invention software receives, as input, the data set resulting from operation of a funnel analysis algorithm. In operation, site managers are usually not interested in funnels starting with all possible pages; they are only interested in funnels starting with a specific set of pages. This type of criterion may be referred to as a starting page criterion. In these cases, further refinements to the funnel analysis program include, for a set of users' clickstreams, reporting all funnels starting with pages (P1, P2, P3, . . . , Pn) having minimum or maximum width X at each level and maximum depth Y.

Funnel reports are useful in e-business because they help product planners analyze the usability and structure of a web site. Given criteria such as the interested starting pages and a maximum/minimum width and/or depths of a funnel, existing algorithms efficiently mine a clickpath file for funnels satisfying all the requirements. Funnel mining results have traditionally been in textual form such as: "Of all hits to Page A, 51% of them were followed by hits to the Page B and 38% were subsequently followed by another hit to Page A."

Funnel mining methods identify huge amounts of patterns in clickstream data that lead to very large result sets. Data mining includes the automated extraction of previously unknown knowledge from large datasets. However, in almost all cases, the data mining results themselves often need to be scrubbed and presented more appropriately to facilitate analysis of the mined results. Finding the top clickpaths or funnels and dumping them into a spreadsheet does little in the way of helping the analyst spot interesting trends or patterns.

Funnel mining analysis relates to data mining and automated knowledge extraction. Funnel mining analysis can be viewed as a specialized type of clickpath mining with a focus on the visual representation of a funnel (e.g., a funnel report) and the knowledge that can be derived from it. Given a funnel report, the invention software aids an analyst in determining the funnels/subpaths that are most relevant to a business. Customers are analysts such as business managers, product planners of sites, or anyone interested in retention of users for sign-up or registration processes in their sites. Businesses can analyze site usability by evaluating on-line sign-up processes. As a result, businesses can re-negotiate deals with content providers or re-design their sites.

The invention presents the funnel report visually in a hierarchical structure (e.g., a tree) to allow an analyst to mine the funnel report. The invention provides software to visually mine funnel reports at various levels including, but not limited to, a URL level for each domain (e.g., for the top 100 URLs or web pages visited in a domain), a domain level for each site, a site level for each service, a service level for the whole network, and a URL level for the whole network (e.g., for the top URLs). For example, a node in the tree may be associated with a URL, domain, site, and/or service. In one form, an analyst may zoom in on certain nodes in the visualized tree. The invention narrows the scope of the visualization, focusing only on subpaths of interest. Visualization techniques of the invention enhance the detection of interesting patterns from sequentially ordered data such as a clickpath. The visualization product of the invention simplifies a visualization space while still retaining a high degree of mineable knowledge in the data.

Although described herein with reference to navigation clickpaths, it is contemplated by the inventors that the invention is operable with other types of sequentially ordered data. For example, sequentially ordered data may include query clickpaths representing a sequence of queries entered by a user at a search web site.

Operation of the Visualization Product

Figure 2:
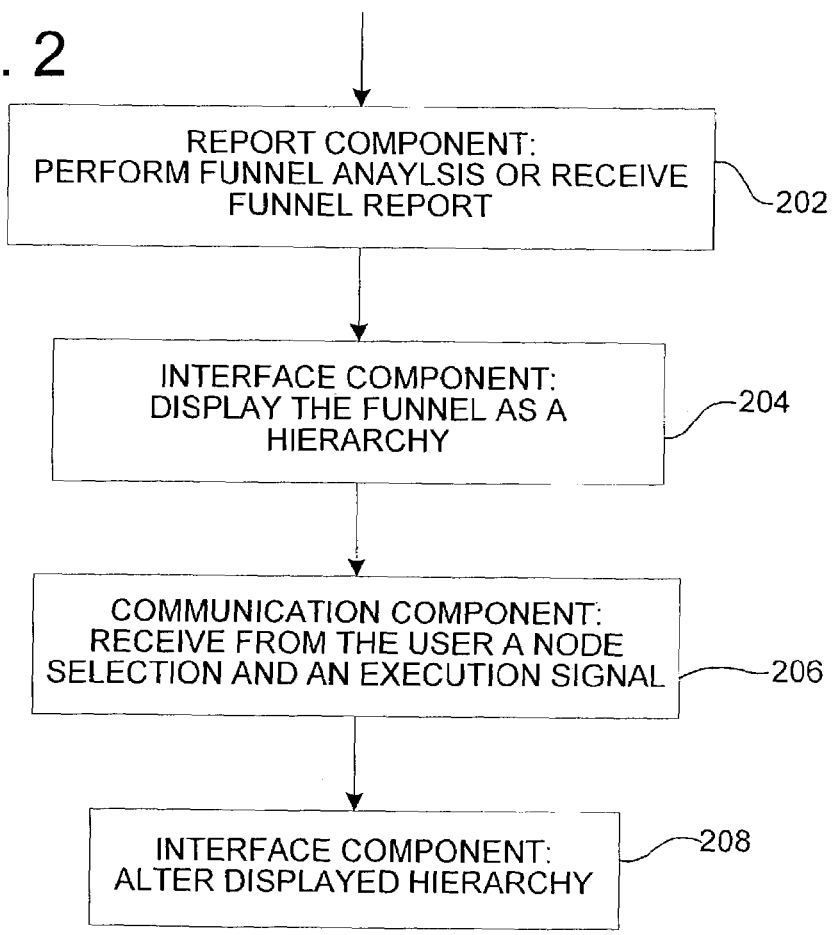
FIG. 2 is an exemplary flow chart illustration operation of the invention software.

Referring next to FIG. 2, a method displays a funnel from clickstream data to a user for analysis where the funnel represents an ordered path of web pages successively viewed by the user. The invention optionally performs a funnel analysis at 202 on the clickstream data (e.g., via a report component) to generate the funnel for display. Alternatively, the report component receives a funnel report from another source. A user interface component displays the funnel as a hierarchy at 204 having one or more nodes each corresponding to at least one of the web pages. A communication component within the software of the invention receives from the user at 206 a selection corresponding to one or more of the nodes and an execution signal from the user to perform an operation associated with the selected nodes. In response to the received execution signal, the invention alters the displayed hierarchy at 208 to indicate a result of the performed operation. The execution signal from the user indicates a desire to perform a function such as the following: zooming in on the selected nodes, sorting the selected nodes, expanding a child node of the selected nodes, expanding all nodes in the displayed hierarchy, visually distinguishing the selected nodes from the other nodes (e.g., coloring the selected nodes), reversing the funnel, previewing a portion of the hierarchy not displayed, displaying a data pertaining to a funnel analysis involving the selected nodes selected nodes, and dynamically displaying additional data pertaining to a funnel analysis involving the selected nodes. In operation, one or more computer readable media have computer-executable instructions for performing the method illustrated in FIG. 2.

Instead of showing all input clickpaths in a display space or clickpath visualizer such as a graphical user interface, the user selects a set of starting pages. This set of starting pages defines the funnels/subpaths that will be displayed in the clickpath visualizer. Focusing clickpath exploration on a smaller set of subpaths, rather than exposing all clickpaths at one time, has the advantage of simplicity. Some site managers are only interested in subpaths that start at their home page or at key pages within their site. Such managers are usually not interested in looking at all clickpaths within their site.

Given a clickpath data file, and the starting pages of interest, a funnel analysis algorithm executes on the data to extract all subpaths (starting with the pages entered) and their corresponding frequency. These subpaths are then imported into the visualization product. For example, the output files containing the funnel results may be translated to an extensible markup language (XML) prior to importing. Alternatively, the visualization product includes a funnel analysis algorithm. Using this data, the visualization product visually represents all subpaths starting with the same page as a tree, where the node at the root of the tree is a starting page of interest that the user selected. Users can select multiple starting pages, in which case each starting page is the root node of a new tree.

Each node displays the corresponding page's uniform resource locator (URL), and represents the subpath that started at the root of the tree and ended at that node. In one embodiment, a computer-readable medium stores a data structure representing a particular node in the hierarchy. The data structure stores at least one clickpath from one or more input clickstreams representing an ordered path of successively viewed web pages of the user. The hierarchy has a root node and each particular node is associated with one of the viewed web pages. The data structure includes an identifier field and a data field. The identifier field stores a resource address (e.g., a URL) for the viewed web page associated with the particular node. Each node also includes data pertaining to a funnel analysis involving the particular node such as a value or measure stored in the data field. The measure type is selected by the user, and can be changed at any time. Different exemplary value types/measures include the number of times a subpath was navigated (referred to as subpath views or absolute frequency of a subpath), the number of unique users that navigated the subpath, the total time spent on a subpath, retention/drop-off percentage with respect to the number of subpath views (relative to the frequency of the root node or the parent nodes), or retention/drop-off percentage with respect to the number of users who have navigated the subpath (relative to the frequency of the root node or the parent nodes). In addition, the data field may store a value representing a color associated with the node.

Navigation

Having a tree structure as the underlying component for clickpath visualization makes navigation a much simpler task. According to the invention, the user has at least three different methods available for interactively exploring subpaths of interest in a tree. In one method, the user expands all child nodes in the next lower level in the hierarchy. At any one node, a user can execute, for example, a simple left mouse click on the node to expand and display (or collapse) all child nodes in the next level. Referring to FIG. 3, all two-level subpaths that start with a hit on a Portal page 302 are displayed. Clicking on the "Portal" root node 302 reveals all pages that were hit after a "Portal" page view 302. This is represented by all the nodes in the second level. With this type of visualization, users can easily expand levels at specific nodes to follow only clickpaths of interest. This attention to focus simplifies the visualization space, at the same time as maintaining the same degree of mineable knowledge in the data.

In the tree in FIG. 3, the user is interested in all subpaths that start with a hit on the "Portal" page 302 (i.e., the root node). Retention values relative to the root node are displayed as the measure. The value in each node in the examples refers to the retention of the subpath (that each node represents) relative to the frequency at the root node (funnel retention values). In the root node, the retention value is always 100%. The second level includes child nodes for "Portal" 304, "Mail" 306, and "Other" 308 (where "Other" 308 refers to other pages on the network). These nodes represent the subpaths "Portal, Portal", "Portal, Mail", and "Portal, Other" respectively. Clicking on the "Portal" root node 302 reveals all pages that were hit after a "Portal" page view 302. In this example, of all hits on Portal 302, 47.6% of them were followed by another hit on Portal 304, 11.6% were followed by a hit on Mail 306 and 11.5% were followed by a hit to Other sites 308.

Alternatively, the user chooses to show the absolute frequency values (subpath views) for each subpath. In an embodiment of the invention software using color, the darker a node is in terms of color, the greater the frequency or retention of the particular subpath in question. Alternatively, grayscaling or cross-hatching is implemented if color is unavailable.

In another method for interactively exploring subpaths of interest in a tree, the user expands child nodes one at a time The more levels a user expands, the more crowded the display space becomes. In some cases, the user may be interested in expanding a select number of child nodes under a parent node. The visualization product of the invention includes a technique called "funnel previewing" that gives analysts a sneak peak of what funnel values and shapes look like for subpaths represented in the next level. A user can right click on a node to display visuals of all funnels in the next level, allowing one to choose the particular "next page" of interest instead of expanding all child nodes.

Figure 4:
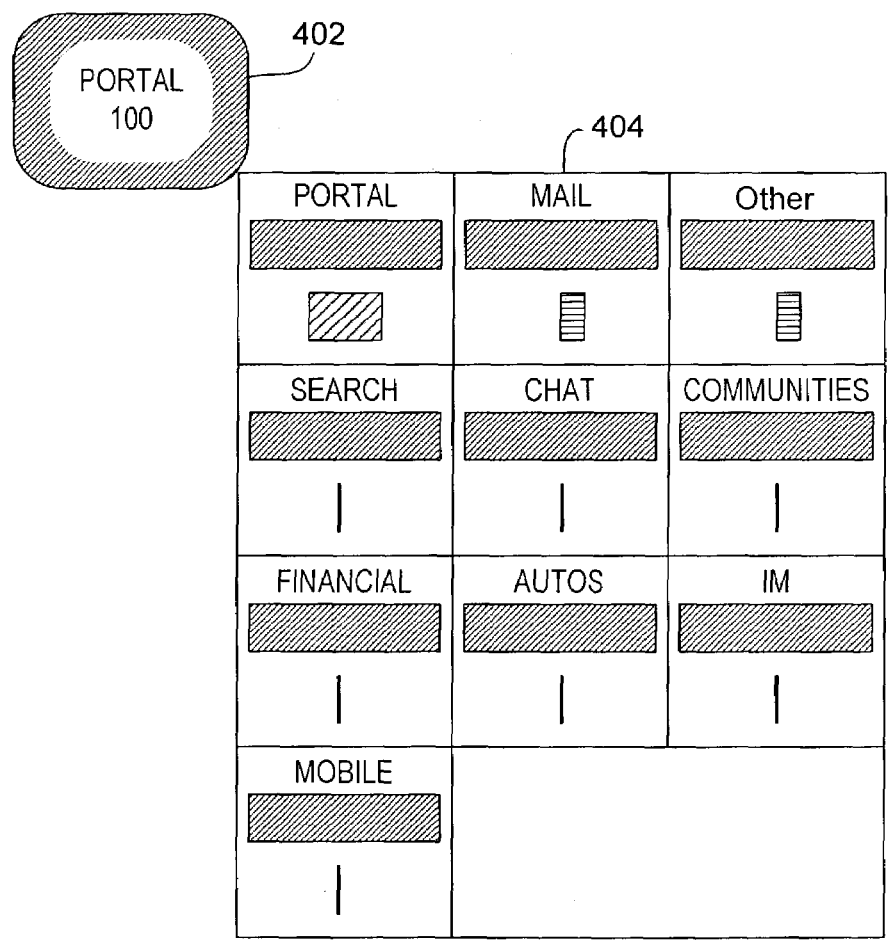
FIG. 4 is an exemplary block diagram illustrating a funnel previewing.
Figure 5:
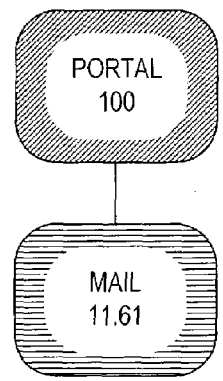
FIG. 5 is an exemplary block diagram illustrating single child node expansion.

Referring next to FIG. 4, the user previews second level subpaths starting with the root node "Portal" 402. The lengths of the bars in each funnel window represent the retention of each step of the subpath relative to the frequency of hits on the root node. Clicking on a funnel displays the selected child node in the next level. In the funnel preview window of FIG. 4, the user selects from any of the funnels to expand the particular child node of interest. In FIG. 4, the subpath with the greatest retention is "Portal, Portal", followed by "Portal, Mail", and "Portal, Other". Clicking on the box in the funnel preview window in FIG. 4 containing "Mail" 404 performs a single child node expansion to display the subpath shown in FIG. 5.

Figure 6:
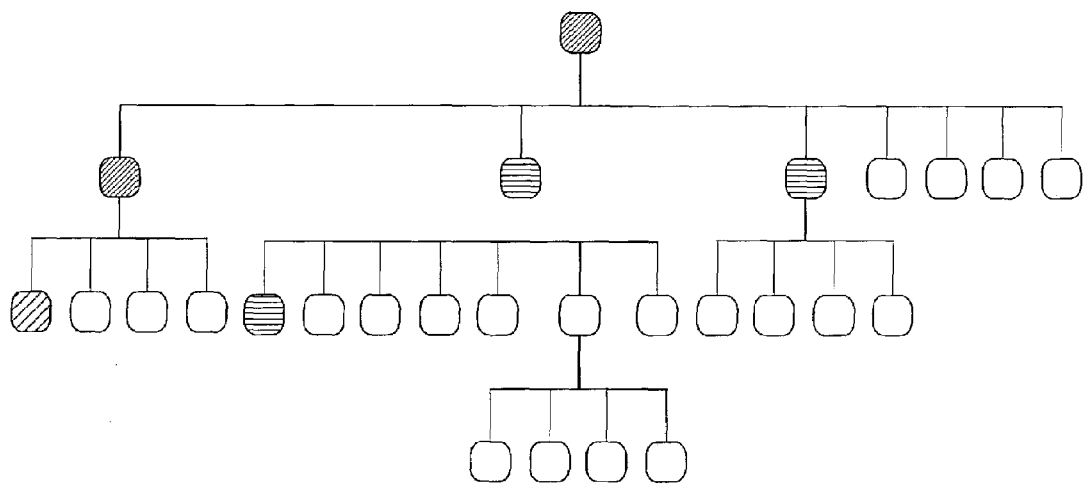
FIG. 6 is an exemplary block diagram illustrating one zoom level.
Figure 7:
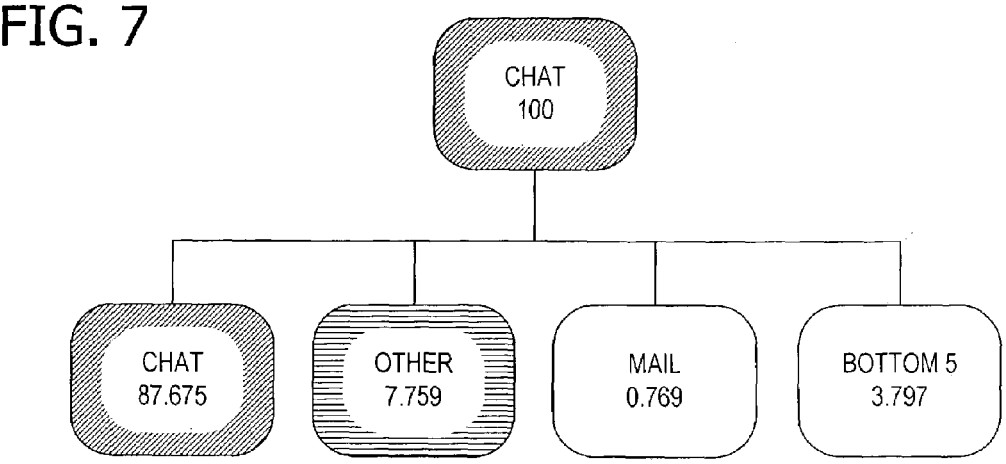
FIG. 7 is an exemplary block diagram illustrating another zoom level.

In another method for interactively exploring subpaths of interest in a tree, the user expands all levels. The above-described navigation techniques are useful, for example, when the analyst has a good idea of where to look for interesting clickpaths. To provide a bird's eye view of all clickpaths, the visualization product of the invention provides the option to look at all subpaths by expanding every level, or limiting depth by specifying a certain number of levels (e.g., under a given node) to fully display. In one embodiment, zooming capabilities are provided to view subpath trees at various zoom values. For example, a zoom value of 100% shows each node clearly, its URL name, and its frequency/retention value. A zoom value of 10% displays all nodes within the main window, but the node sizes are smaller and names and values are not shown. In the majority of cases, the analyst will want to expand all levels, and through the detection tools provided, get an idea of where the relevant clickpaths are, and then zoom into these areas of interest. FIG. 6 and FIG. 7 illustrate two subpath trees of different zoom sizes.

Visual Mining of Patterns

The invention includes a package of tools to facilitate the visual mining of patterns and trends from sequentially ordered data (e.g., clickpaths). An exemplary toolset in the visualization product includes, but is not limited to, color, detection by zooming, detection by sorting and filtering, or detection by activation.

In one embodiment, the visualization product employs color density to represent retention and/or drop off rates. By viewing the color density, the user detects significant retention and/or drop off rates within a subpath tree. Nodes have different color densities depending on the frequency or retention/drop-off values of the subpath represented by the node. For example, if the value inside each node represented the number of times the subpath represented by the node was navigated, and node A represented a subpath that had sixty "hits" and node B represented a subpath with twenty hits, then node A would be colored darker than node B to indicate that there was a higher frequency of traversals for subpath A than for subpath B. Using color density detection, the user can fully expand all levels in a subpath tree and easily spot which funnels have the highest density/dropoff/retention without having to look at any subpath in detail. Different color density schemes can be provided. Nodes can be colored based on their absolute frequency/time spent values and retention or drop-off rates relative to the root or parent nodes. The user can also change base colors for each subpath tree.

Detection by Zooming

The visualization product of the invention also allows detection by exploratory and in-place zooming. The largest number of nodes within a subpath tree is displayed when the zoom value is smallest. However, in such a case, the URL and retention/frequency value of the node cannot be shown since the node itself is so small. Two different techniques allow zooming to local areas of interest while navigating a large subpath tree.

Figure 8:
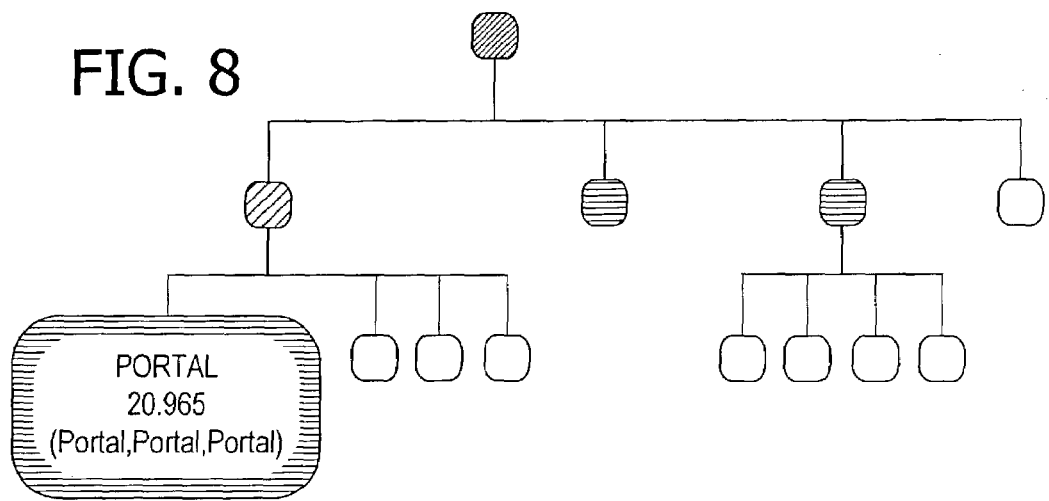
FIG. 8 is an exemplary block diagram illustrating in-place zooming.

An "Exploratory Zooming Mode" enlarges nodes in a neighborhood as a user hovers (e.g., with a pointing device) over an individual node. After the pointing device leaves the node, the enlarged nodes revert back to their original sizes. With "In-Place Zooming Mode," a user permanently enlarges the size of a node by clicking the node and selecting a zoom value. FIG. 8 illustrates an example of in-place zooming.

These zooming modes are useful, for example, when the analyst detects an area containing interesting color density patterns and wants to investigate further. Hovering over the areas and temporarily enlarging nodes facilitates the exploratory work. Highlighting and enlarging a node facilitates discovery.

Detection by Sorting and Filtering

Figure 9:
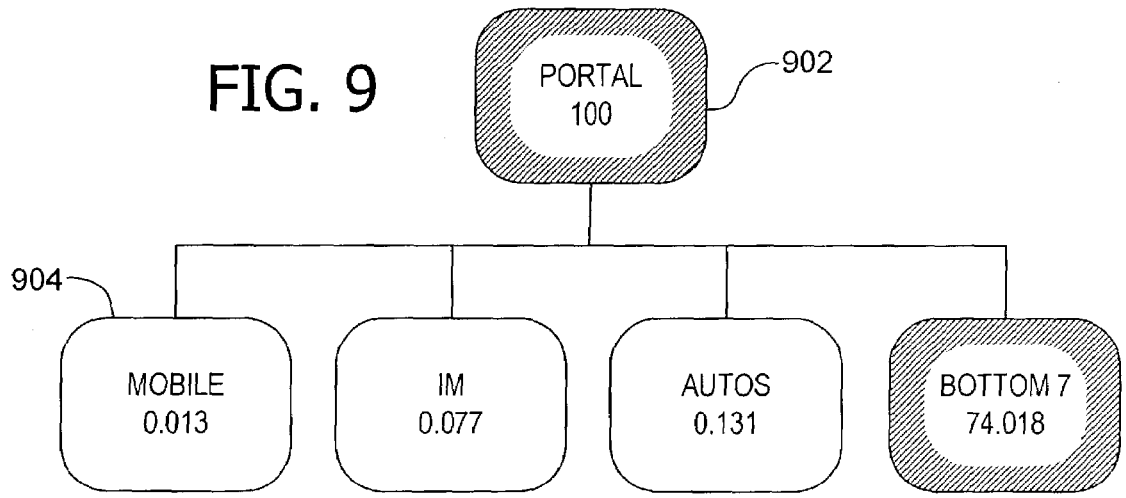
FIG. 9 is an exemplary block diagram illustrating sorting.

The visualization product of the invention also allows detection by sorting and filtering. The visualization product unveils child nodes in each level by descending retention/frequency order. Providing a sort function can help, for example, to detect areas of high retention as well as areas of high drop-off rates. FIG. 9 illustrates second level subpaths sorted in ascending order. For all hits on Portal 902, only 0.013% of them are followed by a hit to the Mobile site 904. Sorting a tree by higher drop-off rate can be useful when the site designer needs to know where users are being lost within the site. For example, an ads team for the Mobile site 904 who has been promoting Mobile 904 on the Portal page 902 via an ad may want to determine the effectiveness of the ad in terms of moving users to the Mobile site 904.

To further assist analysts in the visual mining of trends and patterns, the visualization package of the invention provides core filtering capabilities. Types of filtering identified as being prudent to the clickpath space include, but are not limited to, depth filtering, retention/frequency filtering, URL filtering, or top/bottom subpaths filtering. In depth filtering, the visualization product prunes a tree by depth. For example, with a depth filter of less than four, the visualization software displays only subpaths that are less than four levels deep. In retention/frequency filtering, the visualization software prunes a tree by retention/frequency value. For example, with an absolute frequency criterion of "less than 100 subpath views," the visualization software only shows subpaths that have been traversed fewer than 100 times. In URL filtering, the visualization software prunes a tree by URL in the subpath. For example, with a URL filter "last level URL of www.pagea.com/default.asp," the visualization software only shows subpaths that have www.pagea.com/default.asp as their last hit. In top/bottom filtering, the visualization software prunes a tree by displaying only a predefined number of top or bottom subpaths. For example, with a top/bottom filter of "top 20 subpaths," the visualization software only shows the top twenty full subpaths in the tree. With these types of filters, analysts can easily prune the display space to contain only subpaths that have the exact depth, retention/frequency, URLs, or subpaths desired. Many site managers are interested in a certain number of top or bottom clickpaths, in which case the user applies top/bottom filtering to obtain the desired information.

Detection by Activation

To explore and mine a subpath tree for the first time, the user employs a technique referred to as activation. Activating a subpath tree sets the color of all its nodes to a baseline color (such as white or clear). After a tree is activated, the user specifies interest criteria on subpaths and/or nodes. Those nodes satisfying the activation criteria are colored differently from those that do not satisfy the criteria. The user can specify different colors to be applied for each activation criteria. Types of activation criteria include, but are not limited to, URL, frequency/retention, or top/bottom activation. For URL activation criteria, the visualization software activates and colors only nodes that contain a certain URL. For frequency/retention filters, the visualization software activates and colors only nodes that satisfy a certain frequency or retention criteria. For top/bottom filters activation criteria, the visualization criteria activates and colors only nodes that represent a defined number of top or bottom clickpaths in the tree.

Figure 10:
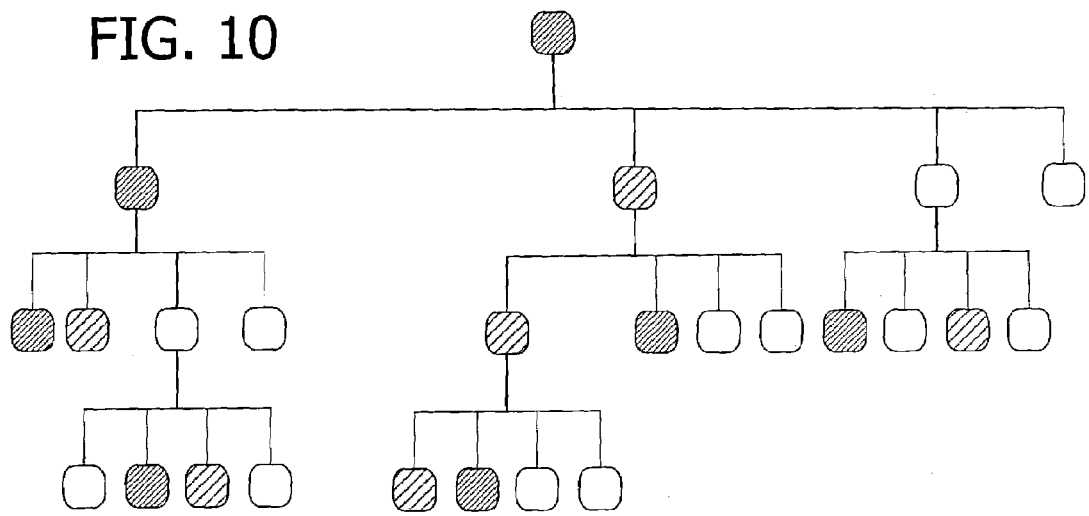
FIG. 10 is an exemplary block diagram illustrating activated nodes.

It is contemplated by the inventors that the use of color may be replaced with other means for distinctively marking or activating nodes. For example, cross-hatching, as illustrated in FIG. 10 and elsewhere, may be employed. FIG. 10 illustrates the Portal subpath tree with all Portal nodes shown with a first type of cross-hatching and all Mail nodes shown with a second type of cross-hatching. If using color, all Portal nodes may be highlighted yellow and all Mail nodes highlighted green. Alternatively, the visualization software may use different borders for activated nodes, different shapes for activated nodes (e.g., circles, squares), or any other type of visual indicator.

Reversing a Subpath Tree

In one embodiment of the visualization software of the invention, visualization is uni-directional. That is, given a starting page of interest, the visualization software displays all subpaths beginning with the starting page. In another embodiment, the visualization is bi-directional in that it visually focuses on all clickpaths entering a certain page.

To implement bi-directional visualization, a reverse funnel analysis is performed on all starting pages to generate reverse clickpath funnels that indicate how website users navigate to a particular page. Alternatively, the visualization software performs such a reverse funnel analysis. For example, the visualization software reverses the order of all clickpaths in a clickstream file and then executes a funnel analysis algorithm on the reversed data. The user selects a node and reverses the subpaths in the tree ending at the selected node visually (e.g., an upside-down tree) to show subpaths entering, rather than exiting, the selected node. Other visual detection and navigational techniques described herein (and elsewhere) can be applied to this reversed tree. However, the data within the tree is different, reflecting entry subpaths. With this functionality, the analyst has full flexibility in visualizing and mining all subpaths leading to and leaving from points of interest in a website.

Figure 11:
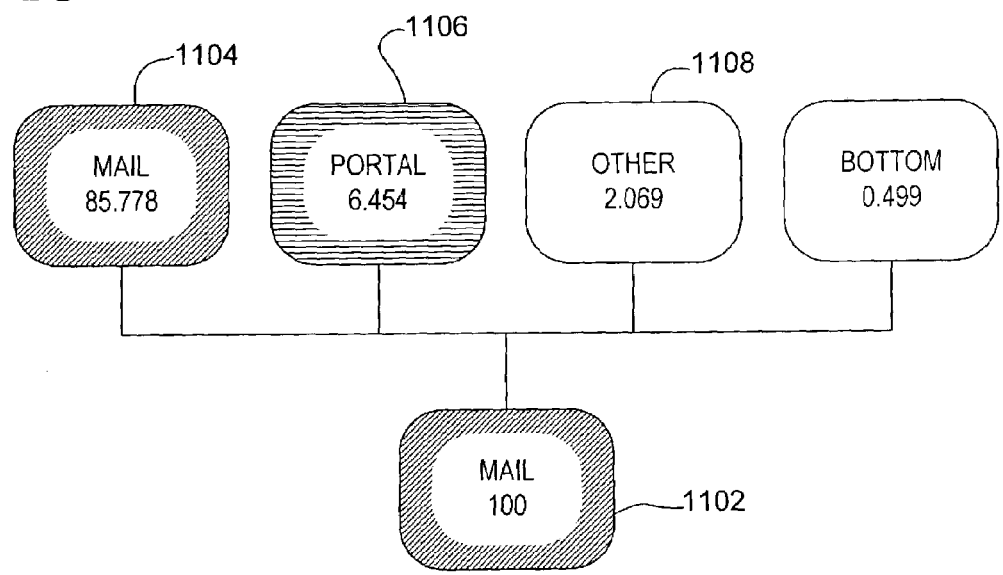
FIG. 11 is an exemplary block diagram illustrating a reversed subpath tree.

FIG. 11 illustrates a reverse subpath tree. The retention/frequency values in the nodes indicate that of all hits on the Mail site 1102, 86% had a previous hit on Mail 1104, 6.5% came from a hit on Portal 1106, and 2.1% had a previous hit on Other sites 1108.

The Visualizer Window (User Interface)

In one embodiment, the invention implements software operating as illustrated in FIG. 2 in a computer system having a graphical user interface including a display and a user interface selection device. The graphical user interface, rendered on a display device, displays a funnel from clickstream data as a hierarchy to a user for analysis. The funnel represents an ordered path of web pages successively viewed by the user. The user interface includes a node in the hierarchy, a user command for performing an operation associated with data pertaining to a funnel analysis involving the node, and a visual indicator associated with the node. The visual indicator results from executing the user command.

Figure 12:
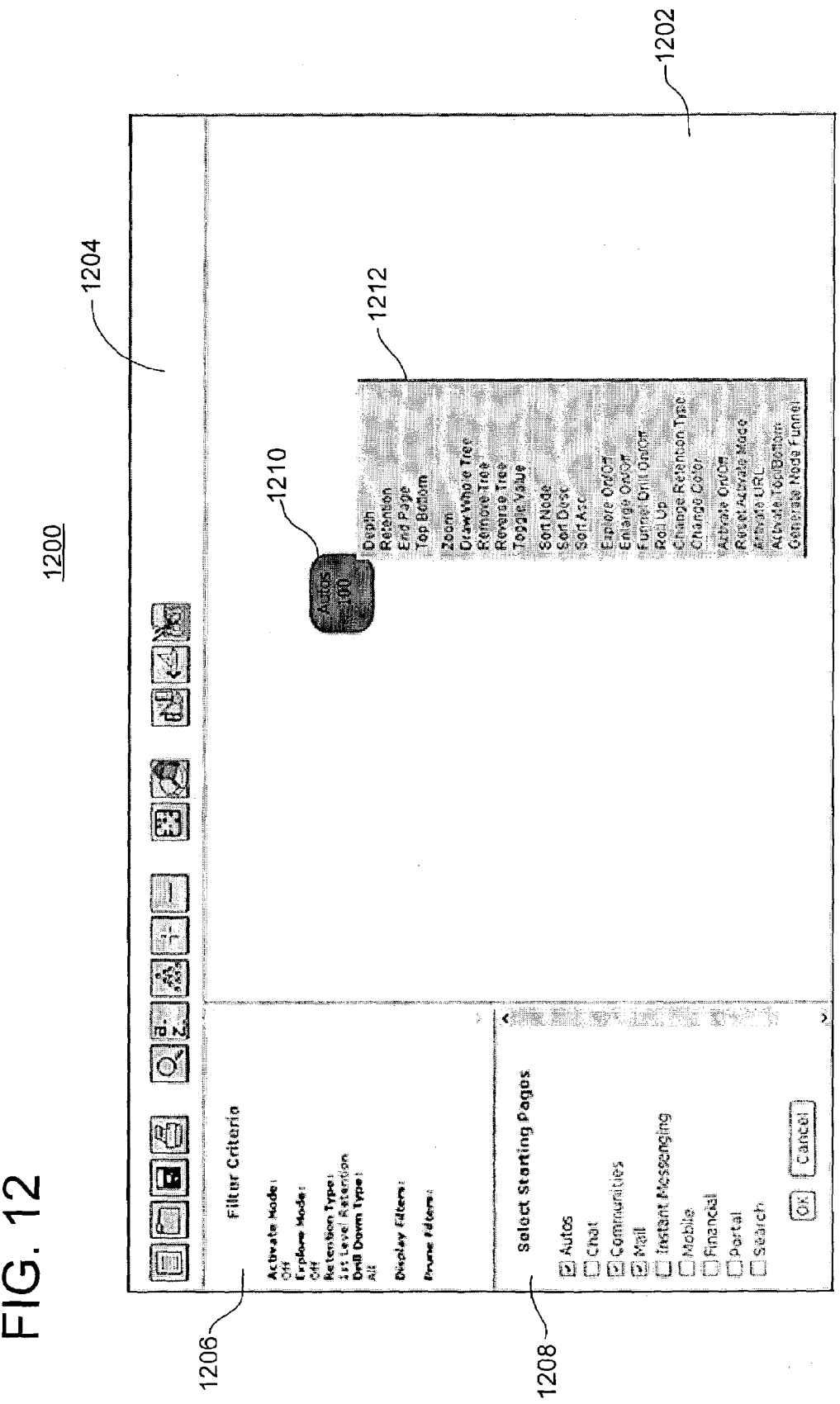
FIG. 12 is a screen shot of an exemplary user interface of the visualization software of the invention.

FIG. 12 illustrates an exemplary user interface (UI) 1200 for the visualization software. Those skilled in the art will note that the UI 1200 illustrated in FIG. 12 and described herein is merely exemplary. It is contemplated by the inventors that more or less functionality may be available within a UI for the visualization software according to the invention. In one embodiment, the exemplary UI 1200 is displayed in a web browser.

In FIG. 12, the large space in the bottom right hand corner of the window of the user interface 1200 contains the clickpath tree output (e.g., node 1210) and is known as the tree visualizer window 1202. Each clickpath tree represents one starting page of a funnel. Multiple trees can be added to the same tree visualizer window 1202, or the user has the option to open up a different tab to hold new funnels. A button bar 1204 at the top of the window contains buttons allowing the user to perform a variety of different functions to all trees in the current tree visualizer window 1202 including, but not limited to, reading in new clickpaths from a different level (e.g., domain, site, or service), opening an existing visualizer file, saving the current visualization, printing the current visualization, adding new clickpath trees, removing clickpath trees, zooming in or out on all trees, sorting all trees in ascending or descending order by the current measure, setting the width/depth/end nodes/URL/activation criteria on all trees, drawing all levels of all trees in the current window, and reversing all clickpath trees to show entry clickpaths.

Any function described herein that can be applied to all trees may be accessible from the button bar 1204. Whenever an end user wants to apply a function on a single tree, right clicking on any node within the tree (e.g., node 1210) brings up a pop-up menu (e.g., pop-up menu 1212) that contains all the functions that can be applied on a single tree.

A "Filter Criteria" box 1206 in the window contains the filter criteria applied to the highlighted/selected tree in the visualizer window. A tree is highlighted/selected whenever the user left clicks on any node in the tree. Each tree also has an invisible rectangular border. Whenever a user clicks anywhere within this border, the tree is highlighted/selected. The nodes of a highlighted/selected tree have a different colored border than the nodes of un-highlighted trees. The content of a "Criteria Specification" box 1208 changes whenever a user runs a function that requires input. The input dialog box is contained in the Criteria Specification area 1208. FIG. 12 illustrates a single node 1210 in a clickpath tree. Content appears in the "Criteria Specification" box 1208 after the user has specified a desire to add more clickpath trees to the display. The diagram in FIG. 12 also shows a sample pop-up menu 1212 that appears after right-clicking on a displayed node. A dialog box allows the user to select from all the possible starting pages for the site. An alternative embodiment displays a scrollable multiple selection list (not shown).

Once submitted, the user views a colored box in the UI 1200 for each starting page selected. Each box or node corresponds to one starting page/clickpath tree. Since the UI 1200 shows clickpaths at the service level for an exemplary network of services, a starting "page" is actually a service such as Mail, Financial, etc. Each node displays the node's URL (or service in this case), and represents the clickpath that started at the root of the tree and ended at that node. Along with the URL of the node 1210, the number 100 refers to the percentage value 100%. Whenever a clickpath tree by retention (default) is displayed, the top node always has a retention rate of 100%.

A user adds starting pages/trees to the display by using an "Add Tree" function. This is the same dialog box as the one shown initially prompting the user to select starting pages, except when an end user explicitly calls this function, the starting pages that are already showing in the visualizer are checked off in the dialog box. A user can remove trees from the display by using a "Remove Tree" function. This can be done by right-clicking on any node (to delete) in the tree and selecting the "Remove Tree" function from the right-click pop-up menu. Alternatively, the end user can choose to remove all pages from the display by accessing the corresponding button on the button bar 1204.

Each node at the top of a tree represents a starting page in a funnel. For example, a tree with the Mail root node represents all clickpaths starting with the Mail site, whereas the tree with a Financial root node contains all clickpaths starting with Financial site. A user traverses these trees by left clicking on each node to display the next URLs visited (i.e., at level two). The tree expands downwards to show, as in the example of FIG. 11, that of all hits on Mail, 85.8% of them were followed by another hit to the Mail site, 6.45% of them were followed by hits to the Portal, and 2.07% were followed by hits to Other sites. In the level under Portal (not shown), the user notices that only 48% of hits on Portal were followed by a subsequent page view of another Portal page and that 11.6 and 11.5% of hits on Portal were followed by hits to Mail and Other sites respectively. Left-clicking on any node expands or hides all child nodes under the selected parent node. After child nodes under the parent node are expanded, left clicking on the parent node hides all its child nodes, and vice versa if the parent node has not had its child nodes expanded. After expansion, a node will have some child nodes (e.g., the first three) showing and the remaining nodes are grouped under a "Bottom/Top" node. Left clicking on a "Bottom/Top" node will expand additional child nodes (e.g., the next three). A user removes a node from the window by right-clicking on the node and selecting the "Delete Node" function.

In one embodiment, there are at least five measures that can be shown in the trees at any one time. Each node within the tree contains the following measures for the clickpath that ended in that node including, but not limited to, the number of times a clickpath was navigated (referred to as clickpath views), the number of unique users that navigated the clickpath, total time spent on the clickpath, retention/drop-off percentage with respect to the number of clickpath views, and retention/drop-off percentage with respect to the number of users. The UI 1200 has a function that pops open a dialog box allowing the user to select the measure to show in each tree. The default measure, for example, may be clickpath view retention.

In regular drill mode, the user left-clicks on a parent node to show or hide the child nodes of the parent node. This translates to expanding the tree to show the next level of hits following the clickpath represented by the selected node. In regular drill mode, all child nodes under a node are expanded. When the user is interested in only expanding certain child nodes, the user can do so by turning on the funnel drilling mode. After funnel drilling mode is turned on, left clicking on a node displays a window showing what the funnels ending at each of the child nodes look like. Selecting one of the funnels in the window displays that specific child node. The clickpaths with the greatest retention or drop-off (based on the current sort order) are shown first. If a node has a large number of child nodes, the funnel preview window will show up to a maximum amount of child nodes (e.g., twelve) but will have a slider or a next button in the window allowing the end user to navigate to the next set of child nodes (e.g., twelve).

Different shades of color in the tree diagrams correspond to the varying degrees of retention. Retention is measured relative to the very top element in each tree. In one embodiment, the top element in each tree has the darkest shade of a color. For all other nodes, the shades of the color are lighter if the retention for the clickpath ending at that node is lower relative to the other nodes. The full set of retention color schemes in the exemplary UI 1200 include, but are not limited to, a first level retention color scheme, a previous level retention color scheme, a first level drop-off color scheme, and a previous level drop-off color scheme. In addition to retention color schemes, the user can change the colors of each tree in the UI display 1200 as appropriate.

By default, all child nodes of a parent node are sorted from left to right in descending order. To change this, the end user uses the sort function to sort nodes in a tree in any order for the currently displayed measure. A tree sorted in ascending order is useful when an analyst wants to analyze drop-off areas within a site. In addition, the user can sort all child nodes under a selected node (e.g., as a function selectable within the right-click pop-up menu).

The regular clickpath tree shown in the exemplary UI 1200 displays all clickpaths that follow a visit to the URL of the node at the top of the tree. The exemplary UI 1200 provides another function that allows an end user to see all clickpaths that were hit before navigating to the URL of the node at the top of the tree. In order to do this, the end user runs the "Reverse Clickpath Tree" function. When this happens, the clickpath tree is reversed and its data changes to show all paths that lead into the node at the (now) bottom of the tree. In a reverse funnel analysis, the visualization software reverses the order of all URLs within each user's sessionized clickpaths and executes a funnel analysis algorithm on the resulting data.

A clickpath tree contains an exponential number of nodes depending on how many unique clickpaths there are following the node at the top of the tree. To limit the nodes displayed, the exemplary UI 1200 provides filtering capabilities based on the depth of the tree, the retention at each level, the end nodes, and the top/bottom clickpaths. In one embodiment, there are two types of filtering that the exemplary UI can perform: prune filtering and display filtering.

In display filtering, the user sets the filter criteria and the display of the tree is automatically updated to show only clickpaths that satisfy the criteria. However, this is only temporary. When the end user collapses any node which has had its child nodes display-filtered, a subsequent expand action on the same node will show all of the original child nodes without any filtering applied. Thus, display filtering only filters the current display and does not filter the actual underlying tree. In prune filtering, the underlying tree is pruned based on the filter criteria specified. When the user collapses a node that has had its child nodes prune-filtered, a subsequent expand action does not show any of its pruned child nodes that did not satisfy the prune criteria.

In depth filtering, a tree is prune-filtered or display-filtered based on its depth. The exemplary UI 1200 provides the user with a dialog box to specify the depth criteria on a tree. For example, the user may indicate an interest in pruning the tree to contain only clickpaths with a depth less than four. Once the end user clicks an OK button, the display of the tree updates to show only clickpaths that satisfy the given criteria. In retention filtering, a tree is prune-filtered or display-filtered based on the retention of nodes at specific levels. A dialog box allows the user to specify the retention criteria on a tree. The retention value refers to the current measure shown in the tree. Therefore, if the current measure shown in the tree is time, then the "retention" value is actually the time spent on a clickpath ending at the selected node. For example, the user may indicate an interest in display-filtering the tree to contain only clickpaths with retention greater than 30% at the second level. Clicking on an OK button in the exemplary UI 1200 display-filters the tree to show only clickpaths that have retention greater than 30% at the second level.

In URL filtering, clickpaths in a tree are prune-filtered or display-filtered based on the URLs (or domain, site, or service names) at specific levels. A dialog box allows the user to specify the URL criteria for the tree. For example, a user can indicate an interest in prune-filtering the tree to contain only clickpaths whose last node contains the URL for Portal. Similarly, the user can specify an interest in prune-filtering a tree to contain only clickpaths that have the URL for Mail at level two.

Another type of filtering is top/bottom filtering where the user indicates that an interest in the top or bottom full clickpaths displayed (e.g., top 10 or bottom 50).

Filtering assists in clearing the display space when the end user has an idea of what the clickpaths on his/her site look like. However, when the user is exploring the clickpath tree for the first time, the user uses tools such as an activation mode to help get a good overview of what type of clickpaths are stored in the tree. In activation mode, users specify certain criteria for nodes or clickpaths of interest. Nodes or clickpaths that satisfy these criteria are colored, grayscaled, cross-hatched, or the like, differently from nodes that do not satisfy the criteria.

When an end user executes the function to enable activation mode for a tree, the colors of the nodes in the tree turn to clear. Activation functions can then be applied to the tree. Activation mode can be turned off at any time by with a "Turn Off Activation Mode" function. An analyst can use the Activate URL function to color all nodes that have a specific URL. For example, the end user indicates in a dialog box to color yellow all nodes with the URL for Mail. Further, the end user may indicate in a dialog box to color green all nodes with URLs for Other sites. Activation is useful, for example, when the user views many clickpaths at once in zoom mode. In this case, the user has a high level view of all clickpaths that contain "Mail" and "Other" without needing to see the URL in the node. A user executes an Activate Value function to color all nodes satisfying certain criteria on the displayed measure. For example, the user can specify an interest in nodes where the number of page views is greater than five hundred or where the retention is greater than 25% relative to the previous level. A user interacts with an Activate Top/Bottom dialog box to color all displayed nodes that satisfy the top/bottom criteria. For example, the user can specify an interest in the top 20 or bottom 30 clickpaths in the tree, in which case the UI will color nodes in these clickpaths the selected color. When a node satisfies more than one activation criteria, the colors within the node are split. That is, if nodes satisfying a first activation criterion are colored red and nodes satisfying a second activation criterion are colored blue, nodes satisfying both activation criteria will be colored half red and half blue. A "Reset Activation Mode" function allows the user to reset the activation color back to clear for all nodes in the selected tree.

Tree, exploratory and in-place node zooming are all different types of viewing techniques that allow the end user to visualize hundreds of thousands of different possible URL combinations. A function in the UI 1200 allows the user to display all levels in a tree and all nodes that satisfy the prune criteria. The UI 1200 also provides a zoom function for clickpath trees. Possible zoom parameters include, for example, 25%, 50%, 75%, 100%, 125%, and 150%. Fonts within the nodes of the trees zoom down or up according to the zoom value. The greatest number of nodes within a tree can be seen when the zoom value is smallest. However, when this happens, the URL of the node cannot be seen easily since the node itself is so small. In this case, the user can opt to turn on "Exploratory Zooming Mode" which will zoom in on nodes in the neighborhood as the user hovers a pointing device such as a mouse over them. Once the pointing device leaves the node neighborhood, the nodes revert back to their original sizes. In "Exploratory Zooming Mode", the user zooms in on nodes as the pointing device moves across them. A user can set "In Place Node Zooming" to permanently enlarge the size of a node by right clicking the node and selecting the zoom value.

The exemplary UI 1200 of the invention is an interactive tool. However, ultimately, the business user will need to output results into a spreadsheet, report or presentation. The exemplary UI 1200 provides at least three types of output options including, but not limited to, funnel view output, tree view output, and text output. As the user navigates through the clickpath tree of a site, the user may be interested in certain clickpaths or in all the clickpaths that have been currently navigated and displayed in the tree. The user can output these clickpaths to another browser window in funnel form. In order to output a single clickpath to funnel form in another browser window, the user right-clicks on the node and selects a "Generate funnel from node" output option. A new browser window opens to display the selected clickpath in funnel form. Optionally, the user can CTRL+select and then right click any of the selected nodes and print out all selected clickpaths into the new browser window.

Optionally, the end user may just want to print what is currently displayed in the tree viewer portion of the application. In this case, the user right clicks on the tree of interest and selects "Print . . . " from the pop-up menu to print the selected tree, or executes the Print button on the button bar 1204 to print all trees displayed. Another print option is to output all funnels displayed in the tree viewer to a file (e.g., as comma separated values, tab separated values, text, or XML). This can be done by right clicking on the selected node, tree or open space and selecting "Print text . . . " to print the values represented by the clickpath ending at the node or tree out into a file.

Exemplary Operating Environment

Those skilled in the art will note that while the embodiments described herein generally relate to web usage data mining, the invention is applicable in other data mining and analysis applications both on- and off-line. For example, the invention may be applied to an input data file detailing on-line and/or off-line product sales for a company. The invention would generate a visualization to identify any interconnections between the sales of various products. For example, the visualization may indicate that 90% of users who purchase product A also purchase product B. The visualization may also indicate whether product B is purchased within a specific time frame of the purchase of product A. Such a visualization by the present invention aids a business owner in tracking customer behavior to allow the business owner to identify trends and improve sales.

Similarly, the invention may be applied to market research. For example, the input file may include the results of a questionnaire completed by a focus group. The invention analyzes the questionnaire results to visualize marketing trends and customer behavior.

Figure 13:
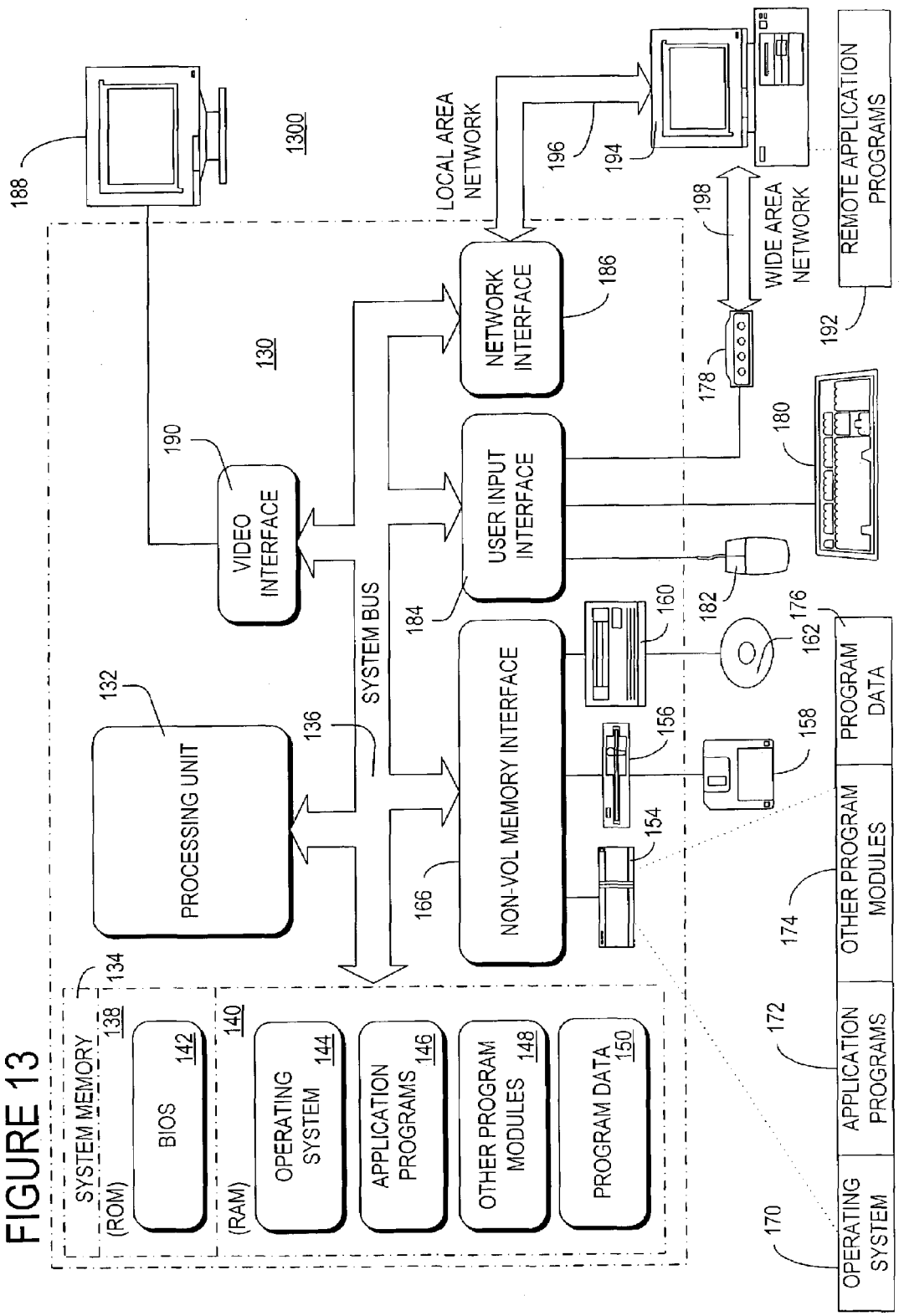
FIG. 13 is a block diagram illustrating one example of a suitable computing system environment in which the invention may be implemented.

FIG. 13 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 13 illustrates operating system 144, application programs 146, other program modules 148, and program data 150.

The computer 130 may also include other removable/non-removable, volatile/nonvolatile computer storage media For example, FIG. 13 illustrates a hard disk drive 154 that reads from or writes to non-removable, nonvolatile magnetic media. FIG. 13 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 13, provide storage of computer readable instructions, data structures, program modules and other data for the computer 130. In FIG. 13, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 13 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 13 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 to display a funnel from clickstream data to a user for analysis where the funnel represents an ordered path of web pages successively viewed by the user.

Application of Visual Mining on Network Clickstream Data

The following examples illustrate the invention. Products such as e-commerce server software and database analysis software implement or use the visualization software of the invention. For example, the user executing the visualization software of the invention may perform an analysis on input clickpath data as follows.

The user first performs a funnel analysis algorithm on sessionized clickstream data at the website level for a particular sample of users who visited a network of sites on three separate days. The user imports this data into the visualization software to analyze the extracted clickpaths. Websites included were Autos, Chat, Communities, Mail, Instant Messaging, Mobile, Financial, Portal, and Search. All other websites were put in an "Other" website category. The following table displays some sample clickpaths.

Table 1. Sample User-Session Clickpaths

TABLE 1

| Sample User-Session Clickpaths |
| --- |
| Sample User-Session Clickpaths |
| Autos, Autos, Communities |
| Chat, Portal, Instant Messaging |
| Mail, Portal, Portal, Autos |
| Instant Messaging, Mail, Portal, Portal |
| Chat, Mail, Chat, Chat, Chat |
| Search, Communities, Search, Search, Mail |
| Portal |

The user wants to know what the more popular clickpaths look like for sessions starting with a visit to Mail. To answer this question using the visualization software of the invention, the user looks at subpaths (with a maximum depth of four) starting with Mail. The user sorts this tree in descending order to display only the more popular subpaths. The user notices Portal hits within many of these top subpaths, so the user sets the tree in activation mode. Activation mode activates all Mail nodes with the color red and all Portal nodes with the color yellow (e.g., see the cross-hatching in FIG. 16). The user notices that a majority of the more popular subpaths starting with a Mail visit also contain a Portal hit. This information is useful when product planning for the Portal site. For example, with this information, the business may justify leveraging the Portal as a prime advertising spot for new products.

In a further example, the user performs a funnel analysis on the clickstream file (such as in Table 1) to extract all funnels/clickpaths less than five levels deep. The user imports this data into the visualization software to analyze the extracted clickpaths. The user wants to know which sites Mail diverts the least amount of its traffic to, which sites Mail diverts the most of its traffic to, and what clickpaths containing Mail and Portal traffic look like.

Figure 14:
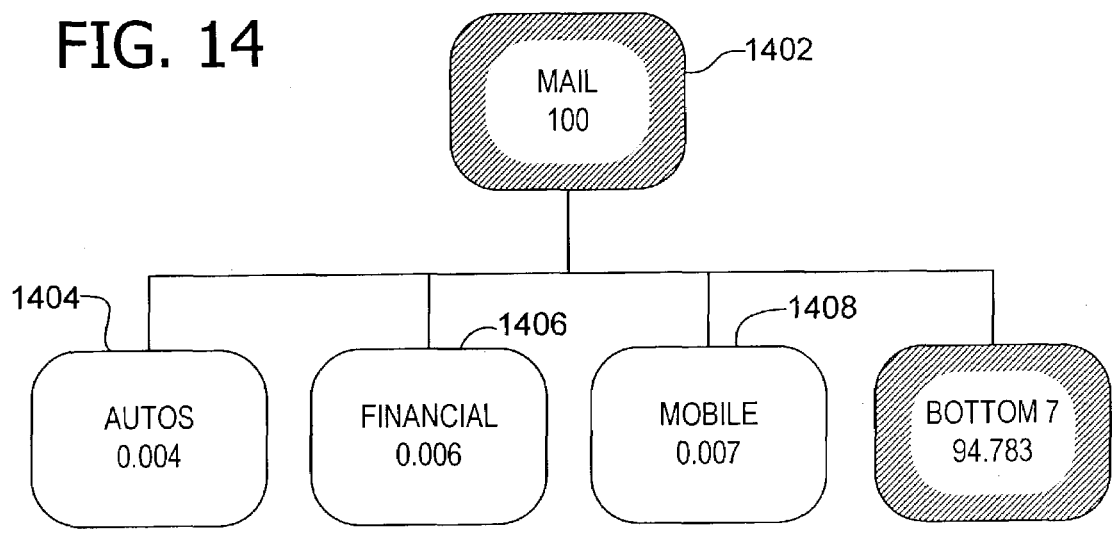
FIG. 14 is an exemplary block diagram illustrating web sites with the least conversion of traffic from a mail web site.
Figure 15:
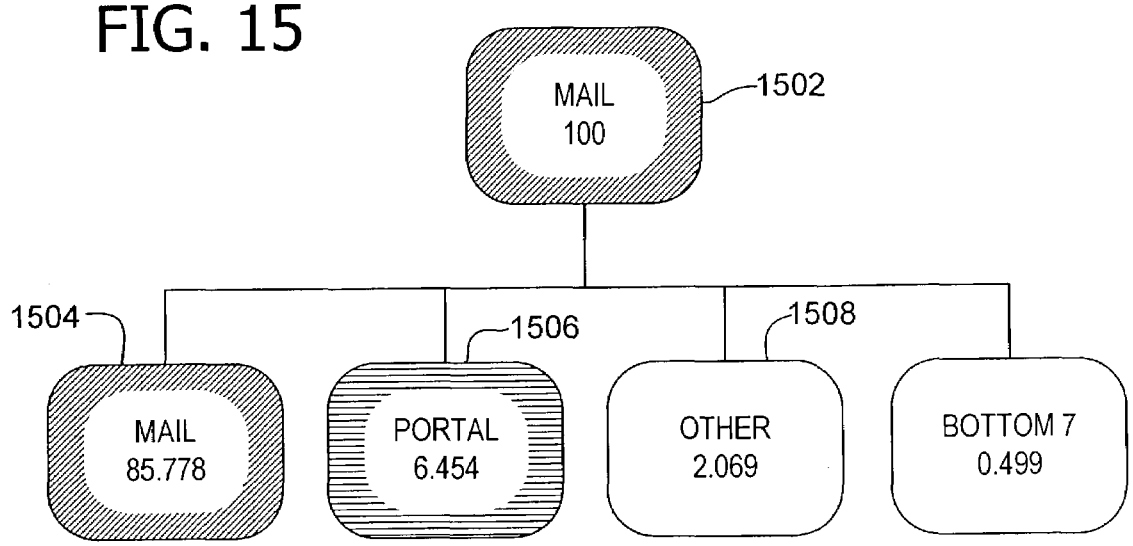
FIG. 15 is an exemplary block diagram illustrating web sites with the greatest conversion of traffic from a mail web site.

The user begins by analyzing all subpaths in the subpath tree with root node "Mail." The user expands all second level subpaths and sorts the child nodes in ascending order to look at the top three sites with the least amount of referred Mail traffic. FIG. 14 illustrates web sites with the least conversion of traffic from the Mail web site. Of all hits on "Mail" 1402, the visualization software shows that only 0.004% of the hits generate conversions to Autos 1404, 0.006% of traffic from Mail 1402 is diverted to the Financial website 1406 and 0.007% is diverted to the Mobile site 1408. Sorting the same subpath tree in descending order as illustrated in FIG. 15, the user determines that 86% of hits on the Mail site 1502 were followed by another hit to Mail 1504, 6% of the hits on the Mail site 1502 were followed by a hit to the Portal's home page 1506, and 2% of the hits on the Mail site 1502 were followed by hits to Other websites 1508.

Figure 16:
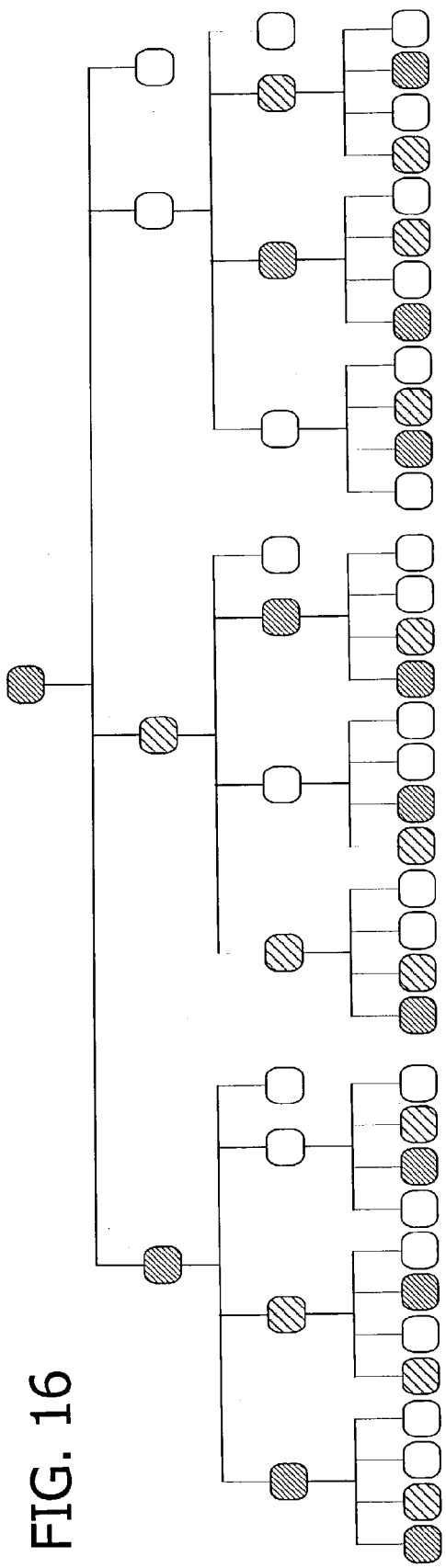
FIG. 16 is an exemplary block diagram illustrating activated mail and portal nodes.
Figure 17:
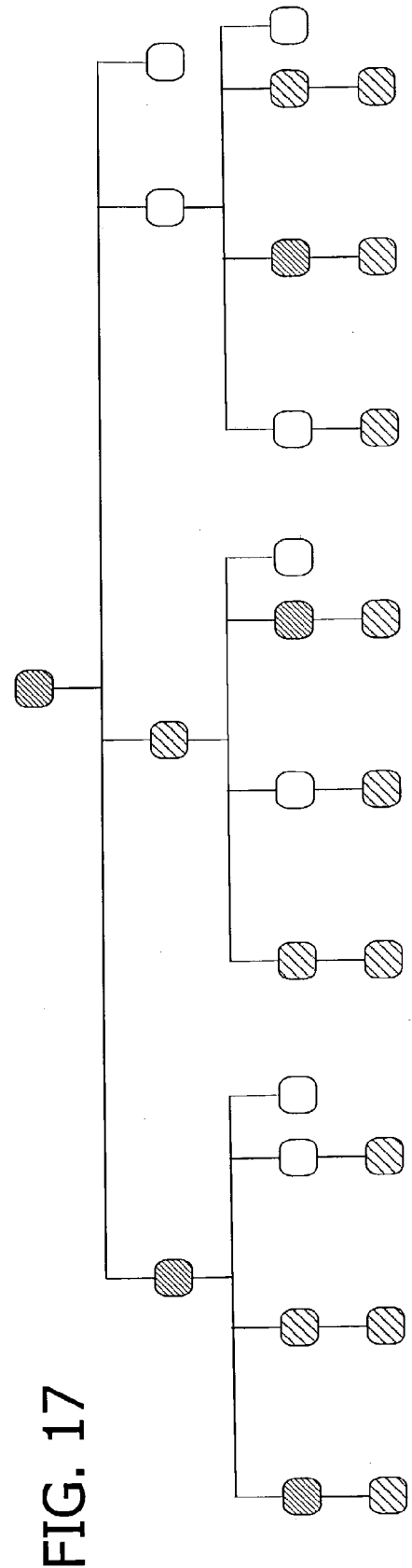
FIG. 17 is an exemplary block diagram illustrating subpaths ending with a portal hit.

The user expands all levels of the subpath tree and puts the tree into activation mode. In this example, only the first three child nodes are displayed in each level. All other child nodes are grouped in the last node of the level. The user activates all "Mail" nodes with the color red and all "Portal" nodes with the color yellow. Cross-hatching corresponding to the colors red and yellow is shown in FIG. 16. Subpaths having Mail and Portal hits are those paths that contain both a yellow and a red node (i.e., both types of cross-hatching as illustrated in FIG. 16). The user notices that quite a number of subpaths starting with a Mail page eventually end up on a Portal page. The user displays only subpaths ending in a Portal page by applying a URL filter of "Portal" on the last level. FIG. 17 shows all subpaths that begin with a Mail page and end in a Portal page.

Unless otherwise noted, the example companies, organizations, products, domain names, uniform resource locators, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. In a computer system having a graphical user interface including a display and a user interface selection device, a method of displaying a funnel from clickstream data to a user for analysis, said funnel representing an ordered path of web pages successively viewed by a plurality of users, said method comprising:

displaying the funnel as a hierarchy on the display, said hierarchy having one or more nodes each corresponding to at least one of the web pages, each of the nodes having a retention rate associated therewith;

receiving from the user a selection corresponding to one or more of the nodes via the user interface selection device;

receiving an execution signal from the user via the user interface selection device to perform an operation as a function of the retention rate associated with the selected nodes; and altering the displayed hierarchy on the display in response to the received execution signal to indicate a result of the performed operation.

2. The method of claim 1, wherein the web pages are associated with a particular domain, site, or service, and wherein the nodes correspond to the particular domain, site, or service.

3. The method of claim 1, wherein receiving an execution signal comprises receiving an execution signal from the user corresponding to a zoom function, and wherein altering comprises altering the displayed hierarchy on the display by executing the zoom function to zoom in on the selected nodes.

4. The method of claim 1, wherein receiving an execution signal comprises receiving an execution signal from the user corresponding to a sort function, and wherein altering comprises altering the displayed hierarchy on the display by executing the sort function to sort the selected nodes.

5. The method of claim 1, wherein receiving an execution signal comprises receiving an execution signal from the user corresponding to an expand function, and wherein altering comprises altering the displayed hierarchy on the display by executing the expand function to expand a child node of the selected nodes.

6. The method of claim 1, wherein receiving an execution signal comprises receiving an execution signal from the user corresponding to an expand function, and wherein altering comprises altering the displayed hierarchy on the display by executing the expand function to expand all nodes in the displayed hierarchy.

7. The method of claim 1, wherein receiving an execution signal comprises receiving an execution signal from the user corresponding to an activation function, and wherein altering comprises altering the displayed hierarchy on the display by executing the activation function to visually distinguish the selected nodes from the other nodes.

8. The method of claim 6, wherein, for each of the selected nodes, executing the activation function comprises displaying a color density for the node, said color density associated with information pertaining to a funnel analysis involving the node.

9. The method of claim 1, wherein receiving an execution signal comprises receiving an execution signal from the user corresponding to a reverse function, and wherein altering comprises altering the displayed hierarchy on the display by executing the reverse function to reverse the funnel.

10. The method of claim 1, wherein receiving an execution signal comprises receiving an execution signal from the user corresponding to a preview function, and wherein altering comprises altering the displayed hierarchy on the display by executing the preview function to preview a portion of the hierarchy not shown in the display.

11. The method of claim 1, wherein receiving an execution signal comprises receiving an execution signal from the user corresponding to a display function, and wherein altering comprises altering the displayed hierarchy on the display by executing the display function to display data pertaining to a funnel analysis involving the selected nodes.

12. The method of claim 11, wherein the data pertaining to a funnel analysis involving one of the selected nodes comprise one or more of the following total time spent on a subpath ending at the node, a retention or drop-off percentage with respect to a number of subpath views relative to a frequency of a root node or a parent node, and a retention or drop-off percentage with respect to a portion of the plurality of users who have navigated a subpath ending at the node relative to a frequency of a root node or a parent node.

13. The method of claim 11, wherein altering further comprises altering the displayed hierarchy on the display by executing the display function to dynamically display additional data pertaining to a funnel analysis involving the selected nodes.

14. The method of claim 1, further comprising performing a funnel analysis on the clickstream data prior to the displaying to generate the funnel for display.

15. The method of claim 1, wherein the clickstream data comprise a query clickpath.

16. The method of claim 1, wherein the displayed hierarchy comprises a tree structure having a root node, wherein each of the nodes except the root node is the child of one and only one of the other nodes, and wherein each of the nodes has zero or more nodes as children.

17. The method of claim 1, wherein one or more computer readable media have computer-executable instructions for performing the method recited in claim 1.

18. A method of displaying a funnel from clickstream data to a user for analysis, said funnel representing an ordered path of web pages successively viewed by a plurality of users, said method comprising:
displaying the funnel as a hierarchy, said hierarchy having one or more nodes each corresponding to at least one of the web pages, each of the nodes having a retention Tate associated therewith;
receiving from the user a selection corresponding to one or more of the nodes;
receiving an execution signal from the user to perform an operation as a function of the retention rate associated with the selected nodes; and
altering the displayed hierarchy in response to the received execution signal to indicate a result of the performed operation.

19. The method of claim 18, wherein the web pages are associated with a particular domain, site, or service, and wherein the nodes correspond to the particular domain, site, or service.

20. The method of claim 18, wherein receiving an execution signal comprises receiving an execution signal from the user corresponding to one or more of the following functions: a zoom function, a sort function, an expand function, an activate function, a reverse function, a preview function, and a display function.

21. The method of claim 18, further comprising performing a funnel analysis on the clickstream data prior to the displaying to generate the funnel for display.

22. The method of claim 18, wherein the clickstream data comprise a query clickpath.

23. The method of claim 18, wherein the displayed hierarchy comprises a tree structure having a root node, wherein each of the nodes except the root node is the child of one and only one of the other nodes, and wherein each of the nodes has zero or more nodes as children.

24. The method of claim 18, wherein one or more computer readable media have computer-executable instructions for performing the method recited in claim 18.

25. One or more computer-readable media having computer-executable components for displaying a funnel from clickstream data to a user for analysis, said funnel representing an ordered path of web pages successively viewed by a plurality of users, said components comprising:
a user interface component for displaying the funnel as a hierarchy, said hierarchy having one or more nodes each corresponding to at least one of the web pages, each of the nodes having a retention rate associated therewith; and
a communication component for receiving from the user a selection corresponding to one or more of the nodes and an execution signal to perform an operation as a function of the retention rate associated with the selected nodes, said user interface component altering the displayed hierarchy in response to the execution signal received via the communication component to indicate a result of the performed operation.

26. The computer-readable media of claim 25, wherein the web pages are associated with a particular domain, site, or service, and wherein the nodes correspond to the particular domain, site, or service.

27. The computer-readable media of claim 25, further comprising a report component for performing a funnel analysis on clickstream data to produce the funnel.

28. The computer-readable media of claim 25, wherein the funnel comprises a query clickpath.

29. The computer-readable media of claim 25, wherein the user interface component displays the hierarchy as a tree structure having a root node, wherein each of the nodes except the root node is the child of one and only one of the other nodes, and wherein each of the nodes has zero or more nodes as children.

30. A computer-readable medium having stored thereon a data structure for a particular node in a hierarchy storing at least one clickpath from one or more input clickstreams representing an ordered path of successively viewed web pages by a plurality of users, said hierarchy having one or more nodes, each particular node being associated with one of the viewed web pages, said data structure comprising:
an identifier field storing a resource address for the viewed web page associated with the particular node; and
a data field storing retention rate data pertaining to a funnel analysis involving the particular node.

31. The computer-readable medium of claim 30, wherein the web pages are associated with a particular domain, site, or service, and wherein the nodes correspond to the particular domain, site, or service.

32. The computer-readable medium of claim 30, wherein the resource address includes a uniform resource locator.

33. The computer-readable medium of claim 30, wherein the data field stores data comprising one or more of the following total time spent on a subpath ending at the particular node, a retention or drop-off percentage with respect to a number of subpath views relative to a frequency of a root node or a parent node, and a retention or drop-off percentage with respect to a portion of the plurality of users who have navigated a subpath ending at the particular node relative to a frequency of a root node or a parent node.

34. The computer-readable medium of claim 30, wherein the data field stores a value corresponding to a visual indicator for distinguishing the particular node from another node.

35. The computer-readable medium of claim 30, wherein the clickstream comprises a query clickpath.

36. The computer-readable media of claim 30, wherein the displayed hierarchy comprises a tree structure having a root node, wherein each of the nodes except the root node is the child of one and only one of the other nodes, and wherein each of the nodes has zero or more nodes as children.

37. A display device having rendered thereon a user interface, said user interface comprising:
a hierarchy representing a funnel from clickstream data, said funnel representing an ordered path of web pages successively viewed by a plurality of users;
a node in the hierarchy, said node corresponding to one of the successively viewed web pages, wherein said hierarchy is a multi-level hierarchy having a root node in a first level corresponding to a starting page, and one or more child nodes in a different level each corresponding to a subsequent web page viewed after the starting page;

a user command for performing an operation associated with pertaining to a funnel analysis involving the node; and a visual indicator associated with the node, said visual indicator corresponding to a result from executing the user command.

38. The display device of claim 37, wherein the web pages are associated with a particular domain, site, or service, and wherein the nodes correspond to the particular domain, site, or service.

39. The display device of claim 37, wherein the user command comprises an activation function for visually distinguishing the node from another node in the hierarchy, and wherein the visual indicator comprises a color density associated with data pertaining to a funnel analysis involving the node.

40. The display device of claim 37, wherein the clickstream data comprise a query clickpath.

41. The display device of claim 37, wherein the displayed hierarchy comprises a tree structure having a root node, wherein each of the nodes except the root node is the child of one and only one of the other nodes, and wherein each of the nodes has zero or more nodes as children.

* * * * *